United States Patent [19]

Woodward

[11] 4,429,824

[45] Feb. 7, 1984

[54] DELTA-ALPHA BOND/SUPERPLASTIC FORMING METHOD OF FABRICATING TITANIUM STRUCTURES AND THE STRUCTURES RESULTING THEREFROM

[75] Inventor: James R. Woodward, La Jolla, Calif.

[73] Assignee: Rohr Industries, Inc., Chula Vista, Calif.

[21] Appl. No.: 303,054

[22] Filed: Sep. 17, 1981

[51] Int. Cl.$^3$ .............................................. B23K 31/02
[52] U.S. Cl. .................................. 228/157; 228/181; 228/194; 228/195; 228/186; 228/189; 228/4.1; 228/212; 228/15.1; 228/44.1 R
[58] Field of Search ............... 228/157, 181, 194, 195, 228/186, 189, 4.1, 212, 15.1, 44.1 R

[56] References Cited

U.S. PATENT DOCUMENTS

| | | | |
|---|---|---|---|
| 3,927,817 | 12/1975 | Hamilton et al. | 228/157 |
| 4,029,254 | 6/1977 | Blair et al. | 228/181 |
| 4,046,305 | 9/1977 | Brown et al. | 228/194 |
| 4,087,037 | 5/1978 | Schier et al. | 228/157 |
| 4,089,456 | 5/1978 | Toppen et al. | 228/195 |

FOREIGN PATENT DOCUMENTS 1398929  6/1975  United Kingdom ............... 228/157

*Primary Examiner*—Brooks H. Hunt
*Attorney, Agent, or Firm*—Patrick J. Schlesinger; Frank D. Gilliam

[57] ABSTRACT

Method of manufacturing structures from sheets of material having superplasticity as well as diffusion bonding capabilities wherein a combination of diffusion bonding and superplastic forming is performed concurrently with the use of low pressures and a simple heat furnace. The material to be formed and bonded is placed between and sealed in tooling constructed of materials having different degrees of thermal expansion. A low pressure from an external source is applied between the sheets of material to be formed during heating. Forming shims positioned within the tooling provide areas of diffusion bonding when the applied pressure and differential of tooling expansion force the sheets of material together at the shim locations.

15 Claims, 7 Drawing Figures

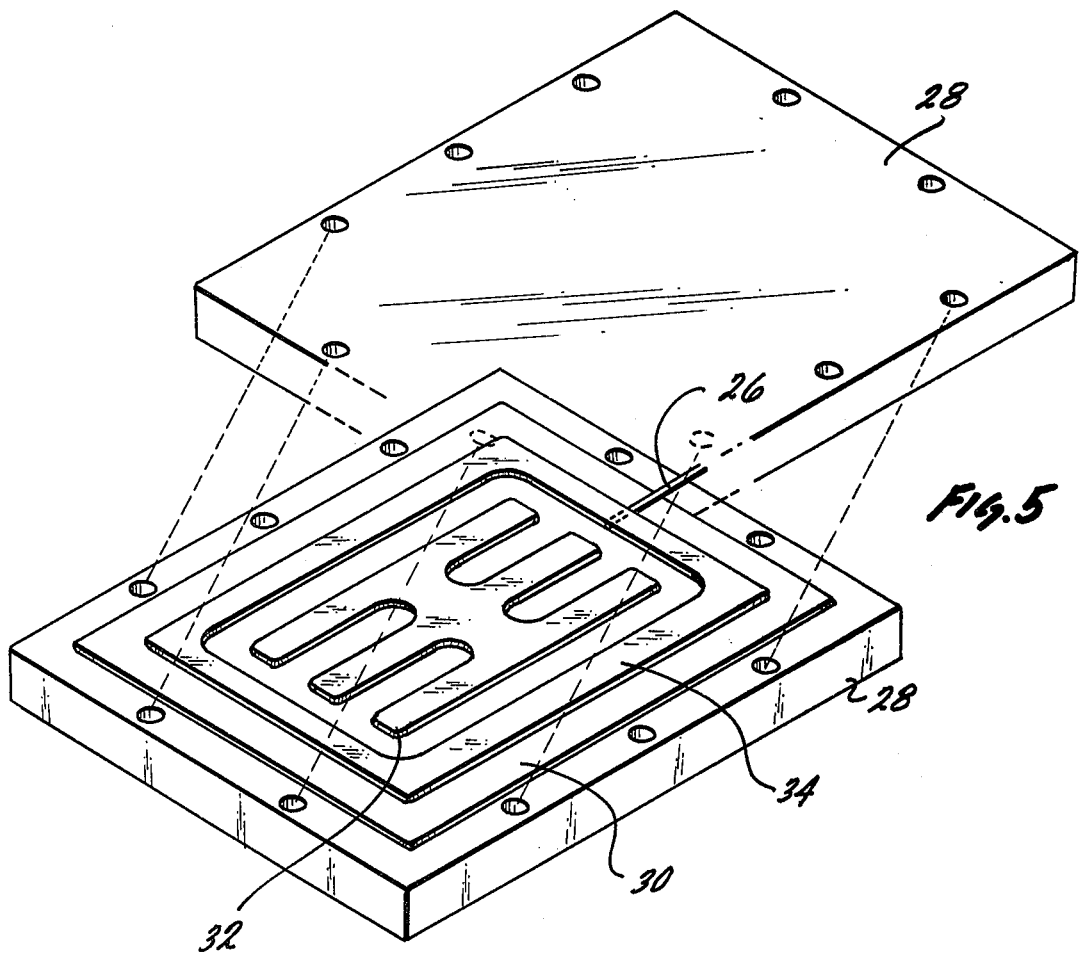
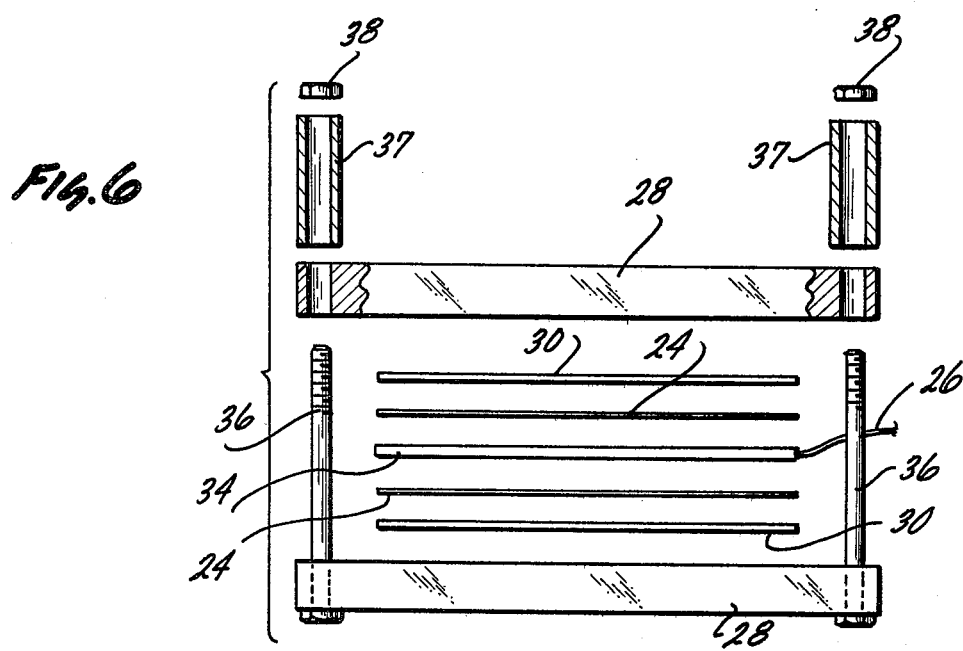

DELTA-ALPHA BOND/SUPERPLASTIC FORMING METHOD OF FABRICATING TITANIUM STRUCTURES AND THE STRUCTURES RESULTING THEREFROM

BACKGROUND OF THE INVENTION

1. Field of the Invention

This invention relates to a process for the forming and bonding of titanium structures and more particularly to an inexpensive method for the superplastic forming and diffusion bonding of titanium structures concurrently by means of low pressure and Delta-Alpha tooling, that is tooling wherein the various components are constructed of materials having different degrees of expansion when heated.

2. Description of the Prior Art

Superplasticity has been known since extraordinary elongations in metals were first observed by C. F. Pearson in England in 1934. Articles by Fields and Backofen (ASTM 1957), Lee and Backofen (AIME Transactions 1966 and 1967) and Chandlhani (Science and Technology Magazine 1968) and others, described superplastic behavior and identified about twenty materials which exhibited superplasticity, among them being two common titanium alloys (Ti-6Al-4V and Ti-5Al-2.5Sn).

Presently, the Super Plastic Forming/Diffusion Bonding (SPF/DB) process requires special facilities to perform the fabrication process.

In Hamilton et al., U.S. Pat. Nos. 3,920,175; 3,927,817 and 3,934,491, relatively large presses are used within a furnace or with heated platens to provide the pressures required for the SPF/DB process. In other methods high pressure autoclaves are employed with internal furnaces or heated tooling much like a hot isostatic press facility. In each different method, specialized facilities are required to contain the high pressure gas environment by which either the diffusion bonding or superplastic forming or both processes are performed.

Titanium is a highly reactive material at the superplastic forming and diffusion bonding temperature range, accordingly, the material must be protected from air at those temperatures. Common practice is to protect the material in an environment of inert gas, such as argon, helium or the like or by use of a vacuum.

Delta-Alpha tooling systems are well known in the prior art.

There has not been an entirely satisfactory low-cost method of simultaneously producing structures by superplastic forming/diffusing bonding until the emergence of the instant invention.

SUMMARY OF THE INVENTION

The invention relates to a low-cost means for superplastic forming and diffusion bonding of titanium alloys using a conventional vacuum or atmosphere (muffle) heat furnace, Delta-Alpha tooling and inert gas pressure. The superplastic forming and diffusion bonding are done concurrently to economically fabricate structures from sheet material.

An object of this invention is to provide a method of combining diffusion bonding and superplastic forming using only a vacuum or an inert atmosphere furnace and simple tools to fabricate structures.

Another object of this invention is to use low forming pressures with minimal effect on the tooling mass.

Still another object of this invention is to fabricate structures of rectilinear and curvilinear including combinations thereof and cylindrical shapes.

These and other objects and advantages of the invention will become better understood by reference to the following detailed description, when considered with the drawings, in which:

BRIEF DESCRIPTION OF THE DRAWINGS

FIG. 5 is a perspective showing of the tooling for producing the part shown in FIG. 4;

FIG. 6 is a side view of the tooling of FIG. 5 and material stacked in assembly order for fabricating a single part.

DETAILED DESCRIPTION OF THE INVENTION

Figure 1:
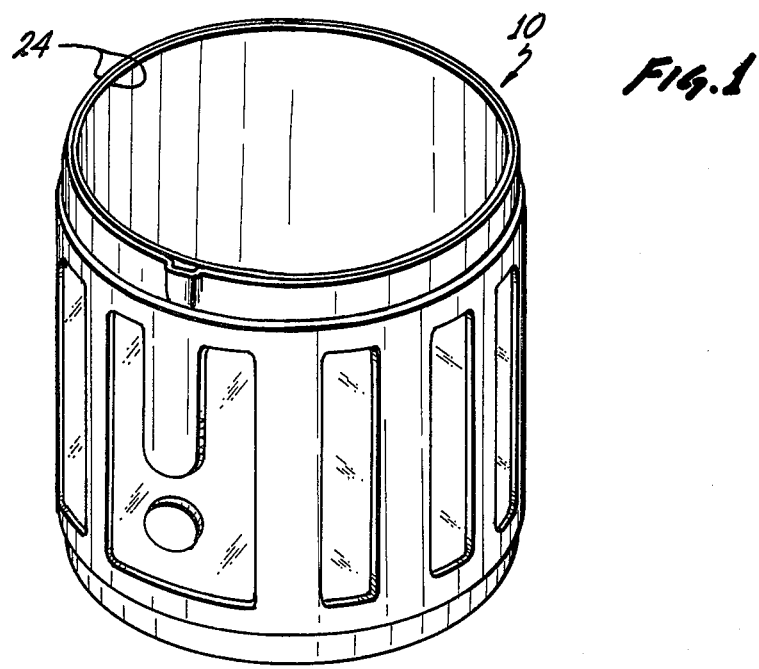
FIG. 1 is a perspective showing of a typical cylindrical part fabricated from the inventive method.
Figure 2:
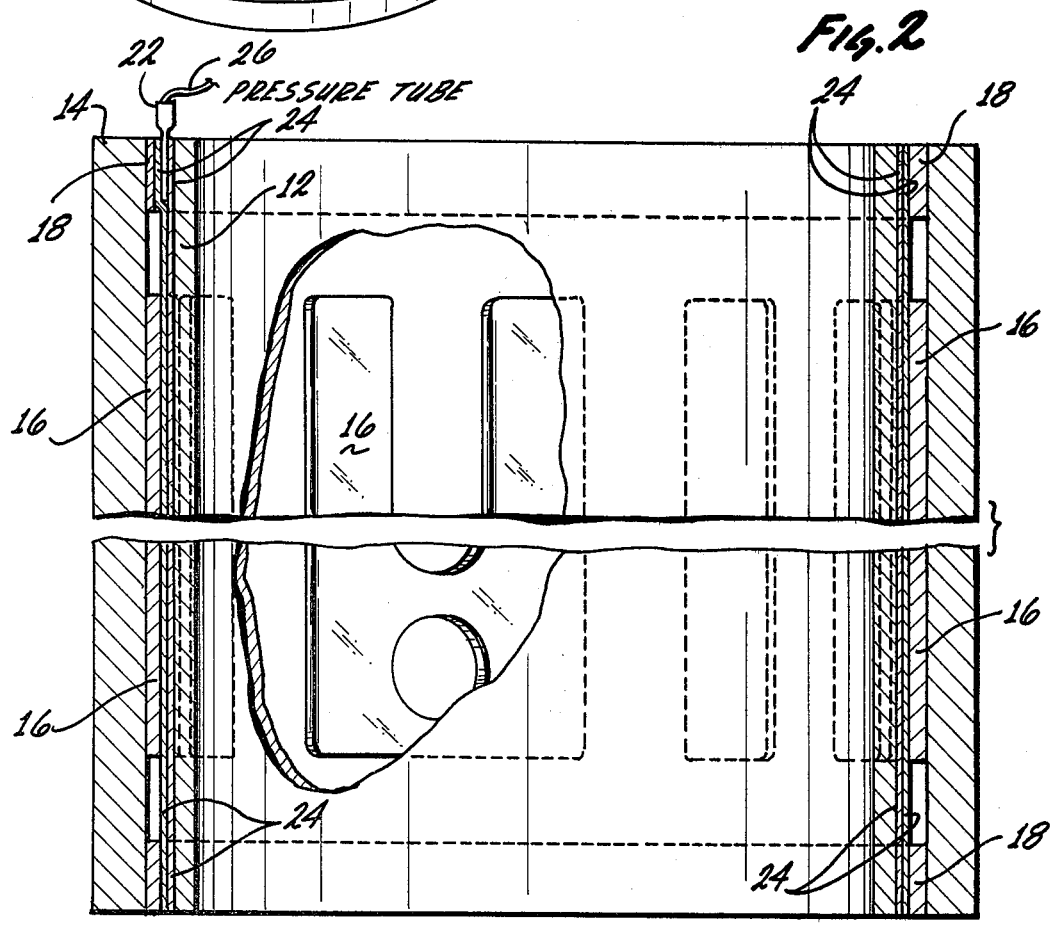
FIG. 2 is a partial cutaway showing of the tooling and material placement for fabricating a cylindrical part from the inventive method.
Figure 3:
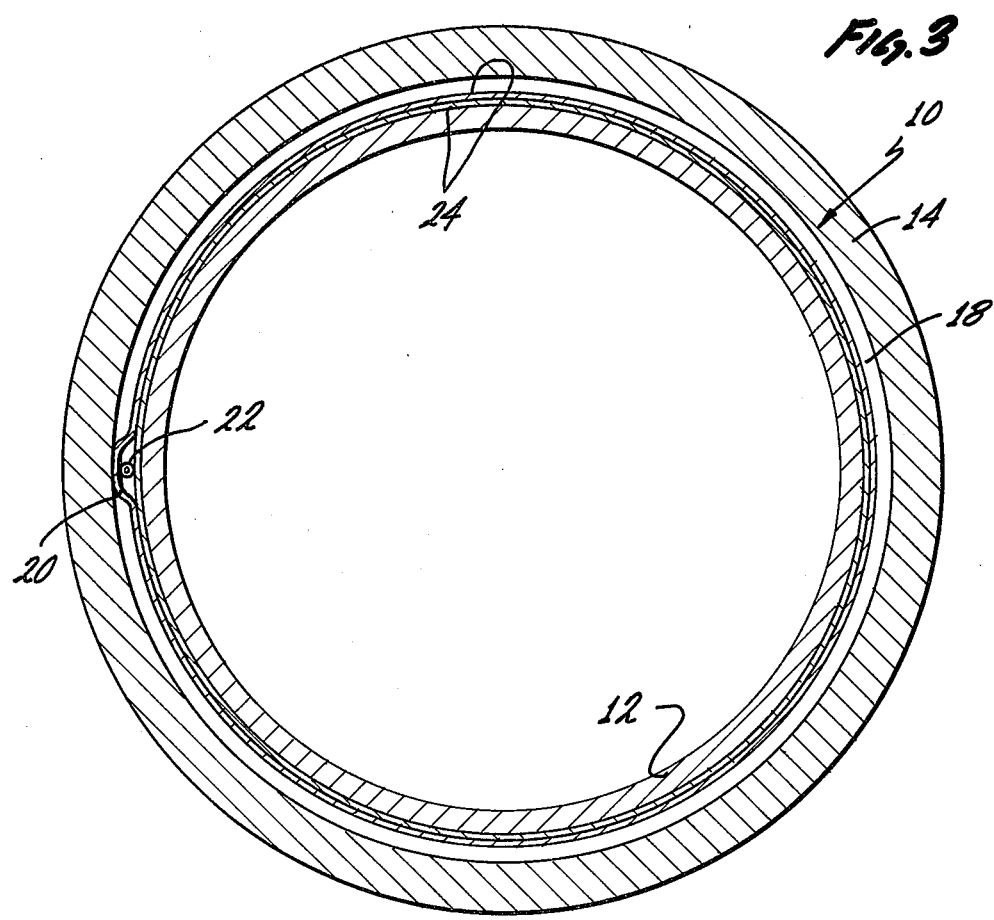
FIG. 3 is a plan view of the showing of FIG. 2.
Figure 4:
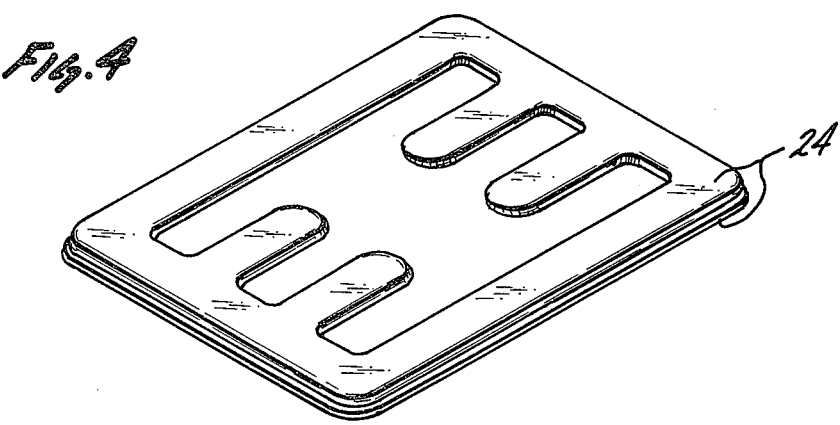
FIG. 4 is a perspective showing of a typical flat part fabricated from the inventive method.

Referring now to FIGS. 1-3. In FIG. 1, a fabricated part 10 having a cylindrical shape is shown. FIGS. 2 and 3 show the tooling required to fabricate the cylindrical shaped part 10. The tooling comprises an internal mandrel 12 constructed of a material having a relatively high coefficient of thermal expansion; an outer mandrel 14 constructed of material with a relatively low coefficient of thermal expansion; forming shims 16 and sealing rings 18. One of the sealing rings 18 has a groove 20 to accept a pressure inlet fittings 22.

The part, composed of two titanium sheets 24 is positioned between the mandrels 12, 14. At the location where diffusing is desired, shims 16 are placed so that the part will be sandwiched under pressure provided by the inner mandrel 12 expanding into the outer mandrel 14. The magnitude of this pressure depends upon the strength and section properties of the mandrel materials. It has been found, by way of example and not limitation, than by using a T-300 austenitic series stainless steel, such as T-321 austenitic stainless steel inner mandrel 12 with a 0.30 inch wall thickness expanding into a T-400 series ferritic stainless steel such as T-430, outer mandrel 14 with a 1.00 inch thickness, the pressure is adequate for a high quality diffusion bond.

On each end of the tooling system, a sealing ring 18 is positioned so that the part is sealed by a pressure bond around its circumference. This bond provides a pressure tight cylindrical part. For example, rings of about 0.4 inch in width provide such a seal.

For cylindrical parts, the two titanium sheets are Ti-6-4 flat sheets formed into tubes by rolling and fusion (TiG or EB) butt welding. These tubes fit one within the other.

The groove 20 of the uppermost end ring 18 provides a small passage between the two titanium sheets so that pneumatic pressure can be admitted. It has been found that a pressure tube 26 of 0.062 inch diameter with a 0.020 inch inner diameter is a practical way to introduce gas pressure. Obviously there are other tube sizes that will work equally as well to practice the invention. The tube entrance between the titanium sheet cylinders can be made in many ways with the primary purpose of obtaining a pressure seal around the tube 26 by the Delta-Alpha pressure.

The tooling system and part sheets are assembled in the order shown in FIGS. 2 and 3. The forming shims 16 are held in place by any conventional means (not shown) such as by welding, pinning or bolting to the adjacent tool surface.

The assembly of tooling and sheets of material 24 is then placed in a furnace. Upon the heating of the assembly, the inner mandrel 12 thermally expanding at a faster rate than that of the outer mandrel 14, causes the parts 24 to be pressed tightly between the two mandrels 12, 14 at the end rings 18 and the forming shims 16. At an elevated temperature of about 1300° F., this expansion pressure is adequate to effectively seal the part interior. A low gas pressure is admitted between the part sheets through tube 26 at a temperature between 1450° F. and 1600° F. at sufficient pressure to cause a slight separation at the locations not sandwiched by the end rings 18 and forming shims 16. A pressure in the range of 10 to 20 psia has been found adequate to separate these areas enough to preclude them from becoming diffusion bonded, thereby eliminating the need for any stop-off materials at the locations where forming is desired.

When the system temperature reaches the superplastic forming temperature, commonly about 1700° F. for Ti-6Al-4V, the pressure through tube 26 applied between sheets 24 is increased at an appropriate rate up to the required higher level. This pressurization forms the locations which are not compressed by the forming shims and end rings and may be in any pattern and depth desired. It has been found, for example, that a pressure rate of about 5 psi/min. or less is a satisfactory rate to cause superplastic forming. Pressures in the range of 35 to 150 psia are common for the maximum pressure to obtain good corner radii and filling of the forming cavities. It has been found that 50 psia with a hold time of 90 minutes or 100 psia with a hold time of 30 minutes will produce good shape control and diffusion bonding of 0.020 inch Ti-6Al-4V. Higher pressures or longer hold times are required for thicker sheets.

This delta-alpha bonding/superplastic forming (DAB/SPF) part fabrication system requires only internal part pressurization and does not require massive tooling because the area over which the pressure is reacted is relatively small, occuring only on the formed areas and then only when the part has filled the cavity. The desired internal pressures are provided from a source of suitable gas under pressure within the pressures are controllable by regulator means well known in the art.

Referring now specifically to FIGS. 4–7. Fabricating curvilinear parts that are not a complete 360° shape or flat parts are also applicble to the SPF/DB system. In these cases, strongbacks 28 are used to react the DB and SPF loads. It has been found that a strongback 28 made from a superalloy, for example and not limitation, Inconel or hastelloy X, configured as an egg crate type structure, about 2 inches in depth, is sufficient to provide adequate pressure over about a 12 inch span. With a 12 inch strongback, narrow parts of noncircular configuration, less than 12 inches wide can be diffusion bonded and superplastically formed by the DAB/SPF system. Obviously, other configured strongbacks, possibly of different material, or configuration could be constructed that would be suitable for use in the DAB/SPF system to produce parts of larger dimensions.

The strongbacks 28 are designed so that they may receive heat uniformly by being relatively open. A superalloy platen 30 having a thickness of from 0.125 to 0.250 inches thick serves to provide a smooth surface and span the openings in the strongbacks 28. In the same manner as that hereinbefore described for the circular configurations, the titanium material 24 is sandwiched between the platens 30 with the appropriate forming shims 32 and edge members 34. It has been found that it is convenient to provide the part 24 with an edge member frame 34 thick enough to be provided with an aperture 0.062 inch in diameter to receive the pressure tube 26. The tube 26 is inserted in the aperture and slightly flared on the inside. The assembly of tooling and material is then made by bolting the strongback 28 together with low thermally expanding refractory metal bolts 36, and nuts 38, such as for example molybdenum. With the application of heat, the low expanding bolts 36 act to close the system, thus compressing the part and causing diffusion bonding. Adding additional thermally expanding amplifiers of austenitic, high thermally expanding sleeves 37, amplify the capabilities of the system.

The same method as described hereinbefore related to circular parts is used, upon heating the seal is formed at the part edges and inert gas applied through tube 28 between materials 24 in the 1450°–1600° F. range. Then after the SPF temperature is reached, the inert gas pressure is increased for the forming action.

Figure 7:
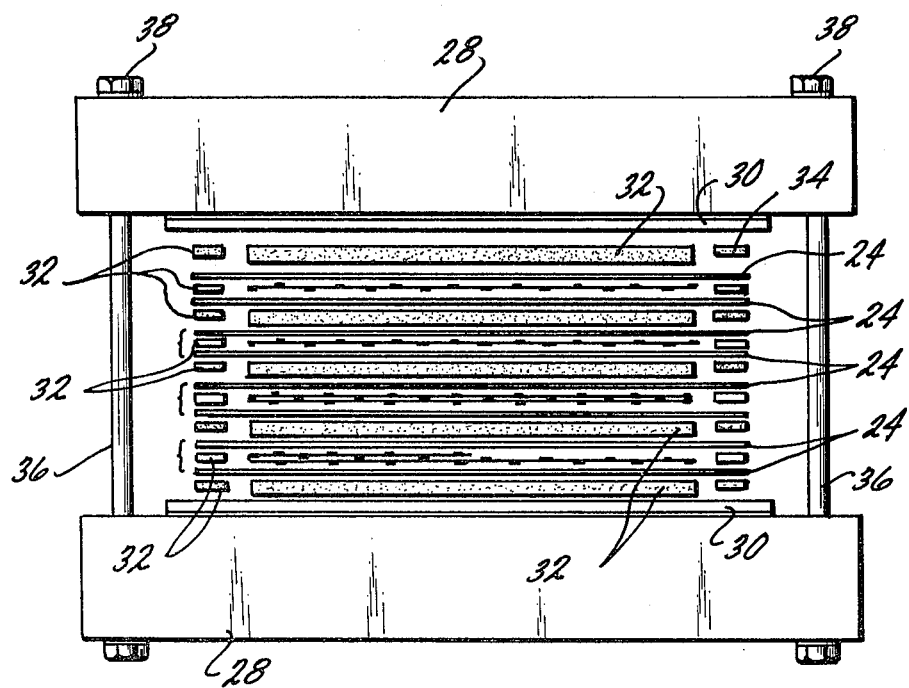
FIG. 7 is a side view of the tooling used to produce multiple parts shown in FIG. 4.

FIG. 7 depicts an assembly for fabricating multiple flat parts formed simultaneously using the flat part method.

In the method described above, relatively long times at temperature are required for both diffusion bonding and superplastic forming. Times on the order of 0.50 to 2.00 hours have been found adequate. The longer the time, as a general rule, the better the diffusion bond developed and also lower forming pressure may be used.

Although the foregoing invention has been described in some detail by way of illustration and example for purposes of clarity and understanding, it should be understood that certain changes and modifications may be practical within the spirit of the invention as limited only by the scope of the appended claims.

What is claimed as new and useful and desired to be secured by United States Letters Patent is:

1. Method of manufacturing structures from sheets of material with superplasticity characteristics comprising the steps of:

placing at least two overlapping sheets of said material between an inner and outer mandrel tool, said inner mandrel tool having a greater coefficient of thermal expansion than said outer mandrel tool;

placing forming shims between one of said mandrel tools and the adjacent sheet at locations where said sheets of material are overlapping and to be joined by diffusion bonding;

sealing the sheets of material from the atmosphere;

applying inert gas under pressure between said sheets when the sealing of the sheets of material from the atmosphere is complete to provide separation of sheets at regions not sandwiched by said shims, and elevating said temperature sufficiently to render said sheets of material to a state of superplasticity to cause said inner mandrel tool to expand toward said outer mandrel tool compressing said sheet material therebetween and causing the contacting surface of said sheets of material to bond together by diffusion means, said gas pressure being sufficient to cause said sheet material to form into the voids between said tooling shims and said mandrel tools.

2. Tooling for combined diffusion bonding and superplastic forming titanium alloy sheet material comprising:
- an inner and outer mandrel, said inner mandrel having a relatively high coefficient of thermal expansion and said outer mandrel having a relatively low coefficient of thermal expansion;
- at least two overlapping sheets of titanium material with superplasticity characteristics disposed between said inner and outer mandrel;
- means for supplying gas under pressure between said at least two sheets of said titanium material when they are positioned between said mandrels;
- means for sealing said at least two sheets of titanium alloy material from the atmosphere when they are positioned between said mandrels; and
- shim means placed between one of said sheets and the adjacent mandrel at locations where the joining of the two sheets of titanium alloy material is desired and omitted from locations where forming of the two sheets of titanium is desired.

3. The invention as defined in claim 1 wherein the pressure of said gas under pressure is at a first level to cause a slight separation of said material between said shims at an intermediate temperature and is at a second elevated level for forming said material at a superplastic forming temperature.

4. The invention as defined in claim 2 wherein said inner mandrel is constructed of a T-300 series austenitic stainless steel.

5. The invention as defined in claim 2 wherein said outer mandrel is constructed of a T-400 series ferritic stainless steel.

6. The invention as defined in claim 2 wherein said means for supplying gas under pressure is a pressure tube passing between said sheets of titanium material in an atmosphere sealed relationship therewith.

7. The invention as defined in claim 2 wherein said means for sealing said two sheets comprises a sealing ring positioned between said inner and outer mandrel at each end surface thereof.

8. A system in which flat mandrels sandwich at least two overlapping superplastic material sheets with intervening forming shims placed in locations of overlap to be diffusion bonded together, the mandrels and assemblage being secured together by low thermally expanding refractory metal bolts which upon heating clamp the assemblage with a pressure which causes diffusion bonding of the areas compressed by the shims and other areas being pressurized by an inert gas to cause superplastic forming of the metals into the cavity caused by the mandrels when the temperature of the assemblage is suitably elevated, said inert gas being admitted by a small tube placed between said material sheets at their outer edges and sealed thereto by the differential in thermal expansion between said bolts and said mandrel.

9. The invention as defined in claim 8 wherein said bolts are constructed of molybdenum and the mandrels are constructed of austenitic stainless steel material.

10. The invention as defined in claim 8 wherein said bolts are constructed of super alloy material.

11. The invention as defined in claim 8 wherein the differential of thermal expansion is amplified by the addition of relatively high expanding sleeves or tubes positioned between said bolts and mandrel.

12. A structure formed from the method of claim 1.

13. The method of claim 1 wherein said step of sealing the sheets of material from the atmosphere comprises providing means for sealing said sheets from the atmosphere when the temperature of said tools is elevated to a predetermined level below the temperature at which said sheets become superplastic.

14. The method of claim 1 wherein said mandrels are annular and concentric.

15. The method of claim 2 wherein said mandrels are annular and concentric.

* * * * *